United States Patent [19]

Blackburne

[11] 4,320,900
[45] * Mar. 23, 1982

[54] RACKETS

[76] Inventor: Robin M. Blackburne, Ardsheal Cottage, Paget 6-20, Bermuda

[*] Notice: The portion of the term of this patent subsequent to May 27, 1997, has been disclaimed.

[21] Appl. No.: 120,742

[22] Filed: Feb. 12, 1980

[30] Foreign Application Priority Data

Feb. 20, 1979 [GB] United Kingdom ............... 5976/79

[51] Int. Cl.³ ............................................ A63B 51/06
[52] U.S. Cl. ............................................... 273/73 D
[58] Field of Search ................ 273/67 R, 67 B, 73 R, 273/73 A, 73 C, 73 D, 73 E, 73 H, 73 K, 76; 124/22, 23 R

[56] References Cited

U.S. PATENT DOCUMENTS

| 1,292,317 | 1/1919 | Holding | 273/73 D |
| 1,502,845 | 7/1924 | Blache | 273/73 D |
| 1,942,479 | 1/1934 | Kleinman | 273/73 D X |
| 3,419,270 | 12/1968 | Eppy | 273/67 R X |
| 3,904,202 | 9/1975 | DeLorean | 273/67 R X |
| 3,966,207 | 6/1976 | Pass | 273/73 D |
| 3,968,966 | 7/1976 | D'Aquanni | 273/73 D |
| 4,118,029 | 10/1978 | Septier | 273/73 D |
| 4,140,316 | 2/1979 | Coupar | 273/73 D X |
| 4,141,549 | 2/1979 | Hayes et al. | 273/73 D X |
| 4,149,722 | 4/1979 | Yager | 273/73 D |
| 4,204,680 | 5/1980 | Blackburne | 273/73 D |

FOREIGN PATENT DOCUMENTS 833195 10/1938 France ........................ 124/23 R
855902 2/1940 France ........................ 273/73 D

*Primary Examiner*—Richard J. Apley
*Attorney, Agent, or Firm*—Brisebois & Kruger

[57] ABSTRACT

This invention relates to a games racket, such as a tennis racket which is "double-strung", i.e. the stringing is disposed in two generally parallel planes located on opposite sides of the head frame. The head frame has a generally radially outwardly opening channel which extends around the outer periphery of the head frame.

In one embodiment, each of the two side walls of the channel is provided with peripherally outwardly opening slots which are spanned by, and receive and locate, the stringing in the associated one of the parallel planes. The stringing in each plane is composed of a pre-woven mesh of discrete string portions, each pre-knotted adjacent its opposite ends. Each mesh is fitted to its associated side wall by locating one end of each discrete string portion in an associated one of a pair of slots on opposite sides of the opening defined by the head frame, with the knot at that end engaged within the channel to anchor that end. The string portion is then temporarily stretched to enable the knot at its opposite end to pass over the peripherally open end of the other of the pair of slots and engage within the channel while the other end is engaged in the other slot, thereby to anchor the other end. The inter-knot spacing of each string portion is precisely predetermined in relation to the spacing between the associated pair of slots which that string portion spans so as to maintain that string portion at the required tension.

23 Claims, 7 Drawing Figures

RACKETS

BACKGROUND OF THE INVENTION

The present invention relates to rackets for playing tennis, squash, badminton, racketball, or other games.

Conventional games rackets which are currently used, and are commercially available, have their playing surfaces formed by opposite sides of a single set of interwoven, tensioned stringing lying in a single median or central plane of the head frame of the racket, and spanning the central opening bounded by the head frame.

It has previously been proposed to replace the single central set of interwoven stringing by two sets disposed in generally parallel planes spaced apart by a distance approximating the thickness of the head frame. Such a "double-strung" racket construction possesses significant advantages over the conventional "centrally-strung" rackets. Particularly advantageous constructions of "double-strung" rackets form the subject of my U.S. Pat. No. 4,049,269 and U.S. patent application No. 895,021.

The invention is particularly concerned with such "double-strung" rackets, and specifically with the manner in which they are strung.

A major problem which has faced the racket industry for perhaps as long as 100 years is how to eliminate, or improve upon, the laborious operation of stringing conventional "centrally-strung" rackets, and a similar problem arises in connection with double-strung rackets. In order to achieve the required degree of tension and resilience in the stringing of, for example, a conventionally strung tennis racket, the stringing must, of necessity, take the form of a mesh woven from a filamentary material, i.e. single or composite filaments of natural gut or synthetic fibres. The mesh is composed of a first group of generally parallel string portions, and a second group of generally parallel string portions extending generally perpendicular to, and interwoven with, the string portions of the first group. The string portions (hereinafter referred to as the "mains") in one group usually extend generally parallel to the longitudinal axis of the handle or shaft of the racket, with the string portions (hereinafter referred to as the "crosses") in the other group extending generally transverse to that axis.

Stringing is usually effected by fitting the head frame onto a stringing machine, threading a stringing filament through stringing-receiving apertures in the head frame, back and forth across the central opening, to string the mains to the required tension, and then similarly stringing and tensioning the crosses, with the crosses woven between the mains. The mains are usually formed from one length of stringing filament, whilst the crosses are formed from another length.

This process possesses the disadvantage that it is relatively time-consuming. One of the most time-consuming aspects is the threading and weaving of the crosses, particularly since it is also necessary to pull through the relatively long unused portion or tail of the stringing filament as threading and weaving progresses.

Another disadvantage of conventional stringing processes, which stems from the foregoing, is that the stringing filaments are prone to damage due to friction between the stringing filaments which gives rise to scorching or burning, particularly when the crosses are pulled through the mains. However, unless the crosses are pulled through the mains relatively quickly, stringing becomes an even slower process.

A further disadvantage is that, as each stringing filament is threaded through an associated stringing-receiving aperture after forming each main or cross, it is tensioned, and this tension must be maintained temporarily by clamps, awls or other anchorages. As a result of these temporary anchorages, the stringing filaments are prone to damage at numerous places along their length during stringing.

Yet another disadvantage of existing stringing processes is that they apply, and are only capable of applying, substantially the same tension to all the mains and crosses, irrespective of their differing lengths. Thus, the resilience of the relatively short string portions, for example the peripheral crosses located adjacent the throat or shaft, will be substantially less than the resilience of the relatively long string portions, for example the central crosses located half-way between the throat and tip of the head frame, which are approximately twice the length of the former peripheral crosses.

Still another disadvantage of existing stringing processes is that they require a racket to be held rigidly in a relatively large and bulky metal framework to avoid distortion of the head frame during stringing.

My aforesaid patent and application both disclose a double-strung games racket, i.e. a racket having a head-frame across the central opening of which extend two sets of tensioned stringing, with each set being disposed in a respective one of two spaced generally parallel planes, the stringing passing through stringing-receiving apertures distributed around the periphery of the frame and opening at their outer ends into opposite side surfaces of the frame, i.e. surfaces which are spaced apart in a direction generally normal to the planes of the stringing.

The apertures are isolated from the outer periphery of the frame by the material of the frame, and the stringing is effected by threading filaments through the apertures to produce the two sets of interwoven mains and crosses in a manner somewhat analagous to that previously described. The stringing technique is therefore prone, to a certain degree, to at least some of the aforementioned disadvantages.

It is an object of the present invention to provide a stringing technique for double-strung rackets which overcomes, or substantially reduces, at least some of the aforementioned disadvantages.

The frame of the double-strung racket disclosed in my aforesaid application is formed, in its outer periphery, with a channel extending around the central opening, the stringing-receiving apertures, intermediate their outer ends, opening into the channel. The channel serves to accommodate interconnecting portions of the stringing filaments which connect the set of stringing in one plane to the set in the other plane.

SUMMARY OF THE INVENTION

In order to achieve the previously stated object, the present invention utilises a channelled frame of this general type, modified by forming some or all of the stringing-receiving apertures as slots or grooves which open into the outer periphery of the frame. In addition, some or all of the string portions (for example the mains and crosses), of which the two sets of stringing are composed, comprise discrete lengths of stringing spanning the central opening and, at or adjacent their opposite ends, located in and anchored with respect to associated slots.

According to one aspect of the present invention, there is provided a games racket comprising a handle intended to be held in the hand, and carrying a head having a frame defining a central opening, across which extends tensioned stringing carried by the head, the stringing being composed of two sets of stringing, with each set being disposed in a respective one of two spaced generally parallel planes, and comprising first and second groups of generally parallel string portions, with the string portions of the first group being interwoven with, and generally perpendicular to, the string portions of the second group, the stringing passing through apertures distributed around the periphery of the frame and opening into opposite side surfaces of the frame which are spaced apart in a direction generally normal to the planes of the stringing, the frame being provided in its outer periphery with a channel extending around the central opening, into which the stringing-receiving apertures open, wherein at least some of the stringing-receiving apertures comprise slots which open into the periphery of the frame, and wherein at least some of the string portions comprise discrete lengths of stringing which, at or adjacent their opposite ends, are located in associated slots and are anchored within the slots or the channel.

Since the string portions are received in peripherally opening slots, the stringing does not have to be drawn or threaded through the slots, but may be inserted through the open ends of the slots. Each string portion may therefore be knotted, or otherwise adapted, to provide anchorages adjacent one or both of its opposite ends before being fitted to the frame. When knotted at both ends, the inter-knot spacing is precisely predetermined in relation to the spacing between the particular pair of opposed slots which that string portion is to span, so that, when fitted, the string portion will be tensioned to the required degree. The pre-knotted string portion is fitted by slipping one end over the frame periphery into one of the pair of slots with the knot seated within the channel behind the slot. Tension is then applied to the string portion by means of a suitable device, for example a hand tool, to stretch the string portion and cause or allow the opposite knotted end to slip over the frame periphery into the other of the pair of slots so that the knot is seated within the channel behind the slots. The string portion is thus retained with the required tension by the two knots which are anchored within the channel. Some or all of the other string portions are fitted in a similar manner, their inter-knot spacings differing in dependence upon the spacings between the slots between which the respective string portions are to be strung, and upon the tension to which they are to be strung.

Thus, from another aspect, the invention provides a method of stringing a games racket as herein defined, which comprises fitting to the head frame a plurality of discrete string portions, each provided at or adjacent its opposite ends with anchorage means spaced apart by a distance which is so related to the spacing between the pair of opposed slots which the associated string portions is to span, that the string portion, when so fitted, will possess the required degree of tension, the method including inserting each string portion into one of a pair of associated slots through the peripherally open end thereof, with the anchorage means within the channel, applying a tensioning force to the string portion at or adjacent the opposite end thereof to elastically stretch the string portion by an amount to permit the opposite end of the string portion to be inserted into the peripherally open end of the other slot of the pair with the associated anchorage means entering the channel, and, after entry of the latter anchorage means, removing the tensioning force to allow tension to be retained in the string portion by the cooperation of the spaced anchorage means with the frame.

The invention also consists in a racket frame which is channelled, slotted, and capable of being double-strung, as herein defined.

The stringing may therefore be supplied by the stringing manufacturer as a pre-woven mesh, provided with knots or other anchorages of the required configuration and dimensions, ready for fitting to a compatibly configured and dimensioned frame. Means are preferably provided to maintain the required relative positions of the interwoven string portions prior to fitting.

Thus, the invention provides not only a double-strung racket, a racket frame for double-stringing, and a method of double-stringing, but also a pre-woven stringing mesh for use in double-stringing.

In order that the invention may be more readily understood, reference will now be made to the accompanying drawings.

DESCRIPTION OF ILLUSTRATED EMBODIMENTS

Figure 1:
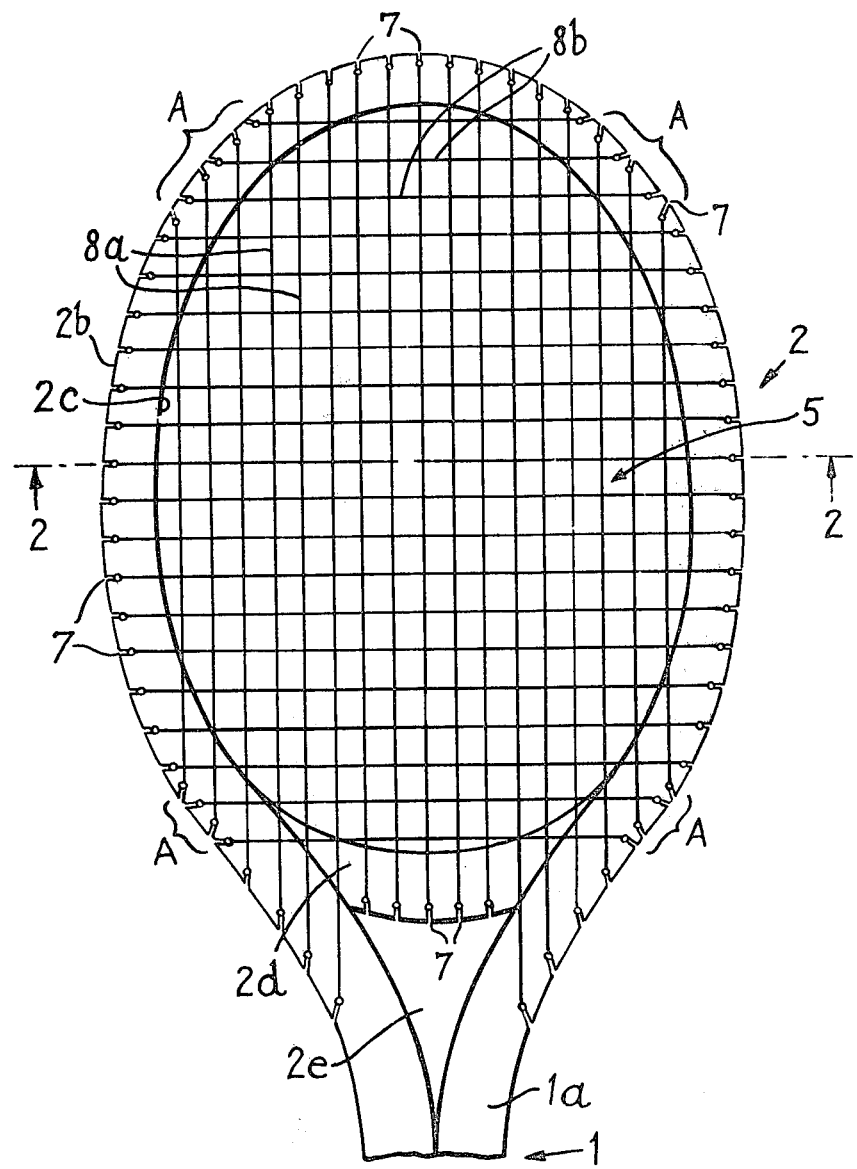
FIG. 1 is a plan view of the head frame of a tennis racket embodying this invention, parts of the stringing being omitted for clarity.
Figure 2:
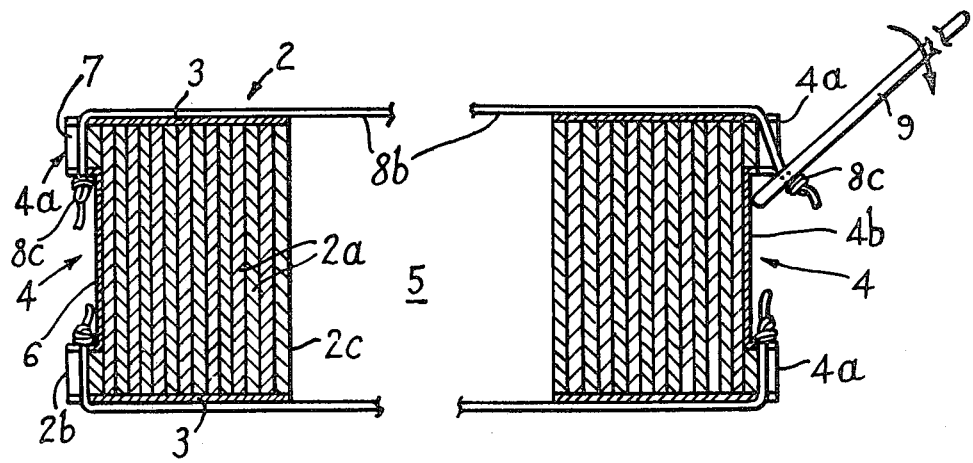
FIG. 2 is a section on the line 2—2 of FIG. 1, on an enlarged scale.
Figure 3:
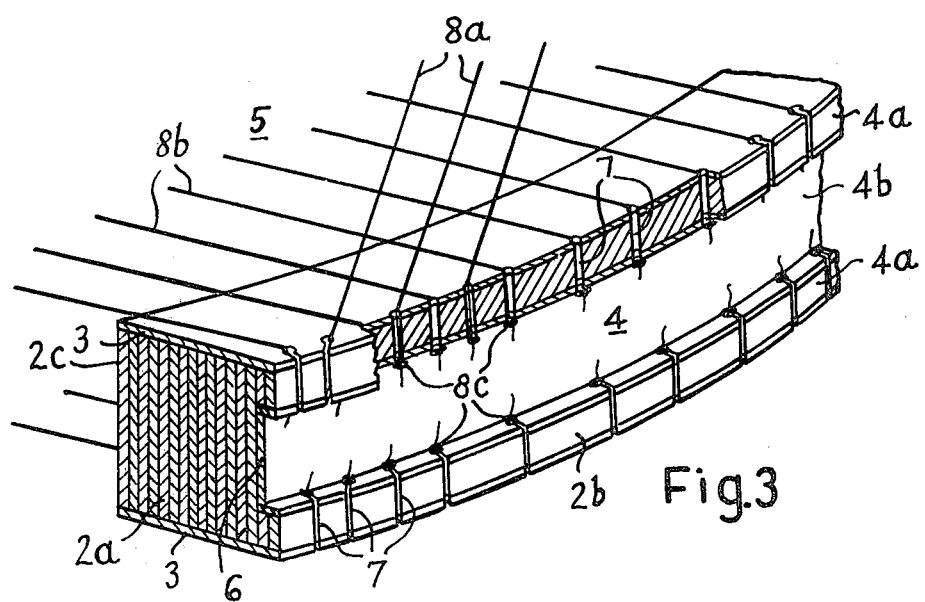
FIG. 3 is a perspective view of a portion of the head frame of FIG. 1, on an enlarged scale, and with the flanges of the channel partly broken away for clarity.

Referring to FIG. 1, a racket, such as a tennis racket, includes a handle or shaft 1 connected by a neck 1a to a head frame 2, and at its opposite or butt end carrying a hand grip (not shown). Whilst, as shown in FIGS. 2 and 3, the frame 2 comprises wood laminations 2a it may advantageously be formed from other materials as described in my aforementioned copending application. In the illustrated embodiment, the opposed side surfaces of the frame have facings of a reinforcing material, for example one or more strips or layers 3 of wood, or fibre-reinforced plastics such as glass, graphite or fibre, bonded to the side surfaces. A channel 4 is routed out of the outer peripheral surface 2b of the frame, the channel 4 extending continuously around the central opening 5 defined by the frame 2, and terminating at or adjacent opposite sides of the neck 1a.

As shown in FIG. 3, the sides and base of the channel 4 are provided with a sealant or protective film or coating 6 which may, for example, comprise a vulcanised fibre coating which is applied to the channel, the frame being subsequently placed in a mold and heated or otherwise treated to bond the coating 6 to the frame. The coating may optionally extend over some or all of the external surfaces of the frame, i.e. over the outer peripheral surfaces 2b, the reinforcing strips or layers 3, and/or the inner peripheral surface 2c.

Stringing-receiving apertures 7 are formed in the opposed flanges 4a of the channel which define the peripherally outer circumferentially extending zones of the side surfaces of the frame. These apertures receive and locate stringing composed of two sets of string portions, one set 8a, 8b lying in the plane which is generally flush with the plane of the side surface which is uppermost in FIG. 1, and the other set lying in a plane generally parallel to the plane of the first set, and generally flush with the plane of the opposite side surface of the frame which is lowermost and concealed in FIG. 1.

The disposition of the apertures 7 is such that the string portions of the lower set are disposed directly beneath (and are therefore obscured by) the string portions of the upper set 8a and 8b as viewed in FIG. 1. Each set comprises two groups of substantially parallel string portions, the string portions of the group 8a (i.e. the mains) being generally perpendicular to, and interwoven with, the string portions of the other group 8b (i.e. the crosses). The distribution of the apertures around the frame 2 is such that the mutual spacing of the string portions in both groups in each set is the same as, or similar to, that of the string portions of a conventional centrally-strung racket, although this is not essential.

The racket so far described is basically similar to that described in my aforesaid copending application. However, whereas the frame described in the latter application is provided with stringing-receiving apertures which are spaced or isolated from the outer peripheral surface of the frame, i.e. are circular-section passages, the frame embodying the present invention is formed with string-receiving apertures 7 in the form of slots or grooves which open through the outer peripheral surface 2b. These slots, which are formed, for example cut or punched, in the opposed flanges 4a of the channel, extend inwardly from the peripheral surfaces 2b to a position adjacent the base 4b of the channel, and the slots in one flange 4a are aligned with those in the other flange. The width of each slot, in the circumferential direction of the frame, is slightly greater that the diameter of the stringing filament, and the inner end of each slot is radiused and chamfered, bevelled and/or padded to minimise stresses on, and chafing of, the string.

In addition, as will be apparent from FIGS. 2 and 3, the string portions forming the groups 8a and 8b of both sets comprise discrete lengths of stringing filament which are located adjacent their opposite ends in an associated pair of opposed slots 7, and are knotted at 8c, the knots being seated in the channel 4 against the internal surface of the flanges 4a thereof to maintain the required degree of tension in the individual string portions.

Before the string portions 8a and 8b are fitted to the racket head, they are individually prepared with the knots 8c at their opposite ends. The spacing between the knots of each string portion is precisely predetermined in relation to the particular pair of opposed slots 7 which that string portion is to span, so that when the string portion is fitted, and its knots are properly seated as shown in FIGS. 2 and 3, the string portion is under the required degree of tension.

Figure 5:
FIG. 5 is a plan view of a manual tensioning and fitting tool for use in stringing the head frame of FIG. 1.

To fit a string portion, for example the top string portion in FIG. 2, one end is first slipped into the peripherally outer end of one of a pair of opposed slots 7, with its knot 8c inside the channel 4 so that it will seat against the channel flange 4a as shown at the top left in FIG. 2. A hand tool as shown in FIG. 5, comprising a lever 9 having a "V" slot 9a at one end, is used to stretch the string portion and slip the opposite end thereof into the other slot of the opposed pair. This is achieved, as indicated at the top right of FIG. 2, by inserting the opposite end of the string portion into the "V" slot 9a with the knot 8c seated against the rear of the lever 9, locating the slotted end of the lever 9 against the internal surface of the flange 4a, and pivoting the lever clockwise in the direction of the arrow, until the knot slips off the lever into the channel 4 at the bottom of the slot 7.

All or the majority of the mains or crosses are pre-knotted and fitted in a similar manner.

The residual tension in the fitted string portions may be substantially identical, or may differ as required, and may be pre-selected within the usual range of 40 to 60 pounds. A lever 9 which is approximately 12 inches long will provide sufficient leverage to allow the string portions to be readily stretched to tensions within this range, as well as to apply the slightly greater tensions which temporarily occur as the string portions are levered to, and past, the position shown in FIG. 2. In order to minimise the amount of this latter temporary excess tension, the slotted end of the lever should be made as thin as possible, and the radial height of the flanges 4a, and in particular of the internal faces thereof, relative to the bases of the slots 7, should be minimised. However, the minimum height of the flanges should be sufficient to ensure that the seated knots 8c are wholly within the channel 4 so as to be below the outer peripheral surfaces 2b, and therefore protected against impact and abrasion during use. In addition, the height and configuration of the internal faces of the flanges, at least in the regions of the slots 7, must be such as to prevent seated knots 8c from inadvertently slipping out of the channel.

Referring to FIG. 1, the slots 7 preferably extend generally parallel to the directions of their associated string portions except where, in the four zones indicated at A, such a parallel disposition would result in intersection of adjacent slots, leading to weakening of the flanges 4a. When the two slots 7 associated with one string portion are of different lengths (compare the slots in the neck 1a with the opposed slots in the tip of the frame), the tension will be applied by levering adjacent the shorter slots to minimize the aforementioned temporary excess tension. This also eliminates problems, for example at the neck 1a, where the excessive inclination of the outer peripheral surface relative to the slots as viewed in FIG. 1 would, in all probability, not provide a satisfactory purchase for the lever 9.

As shown in FIG. 2, the bases of the slots 7 are located as close as possible to the base 4b of the channel consistent with proper seating of the knots, so as to minimise the outward bending moments which the tensioned string portions exert on the flanges 4a via their knots 8c. These bending moments may be reduced by inclining the bases of the slots 7, so that they define obtuse included angles with their respective outer side faces of the frame 2. For example, a frame configuration analagous to that of FIG. 27 or FIG. 28 of my aforesaid copending application, but with the apertures 7b in those figures replaced by stringing-receiving slots, is envisaged.

Figure 4:
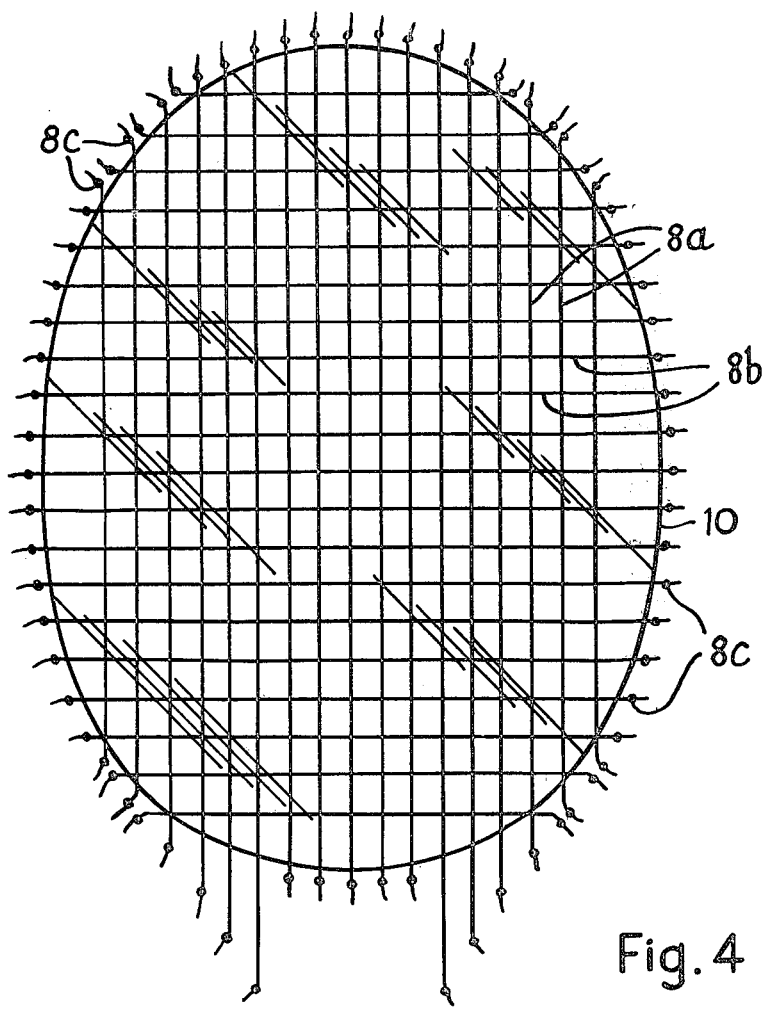
FIG. 4 is a view of a pre-woven mesh intended to form one of the sets of stringing of the head frame of FIG. 1.

Since the stringing is composed of discrete and individually anchored string portions interwoven to provide the mains and crosses, and not a single long length of stringing filament threaded up and down across the opening 5 to form the mains, and another single length threaded back and forth across the opening, woven in and out of the mains, to form the crosses, the string portions may be supplied by the string manufacturer or factory as a pre-woven and pre-knotted mesh, one embodiment of which is shown in FIG. 4. To at least one side of the mesh is temporarily adhesively secured a thin sheet or film 10, for example of a transparent synthetic plastics material such as a polyvinyl chloride, which serves to maintain the correct relative positions of the string portions 8a and 8b before the mesh is fitted to a head frame. After fitting the mesh, the film is peeled off. Two such meshes are fitted, one to each side face of the head frame, in the manner previously described. Since the string portions are supplied as a ready woven and knotted mesh to suit a particular head frame, it will be appreciated that the meshes may be fitted to a head frame by relatively unskilled persons in a rapid and simple manner, merely by using the manual lever 9 as described.

The pre-woven meshes may be packaged for sale to the public, so as to identify the particular racket and stringing characteristics. For example, a pair of pre-woven meshes may identify the type of racket as a Blackburne Mark II; the type of stringing filament as nylon twist; the gauge of the filament as 15; the strung-up tension as 48 pounds; and the number of string portions per mesh as 19 crosses and 16 mains. The public would thus be able to purchase pre-woven meshes to fit their particular racket, and would know exactly what the ultimate tension of the stringing would be.

Figure 6:
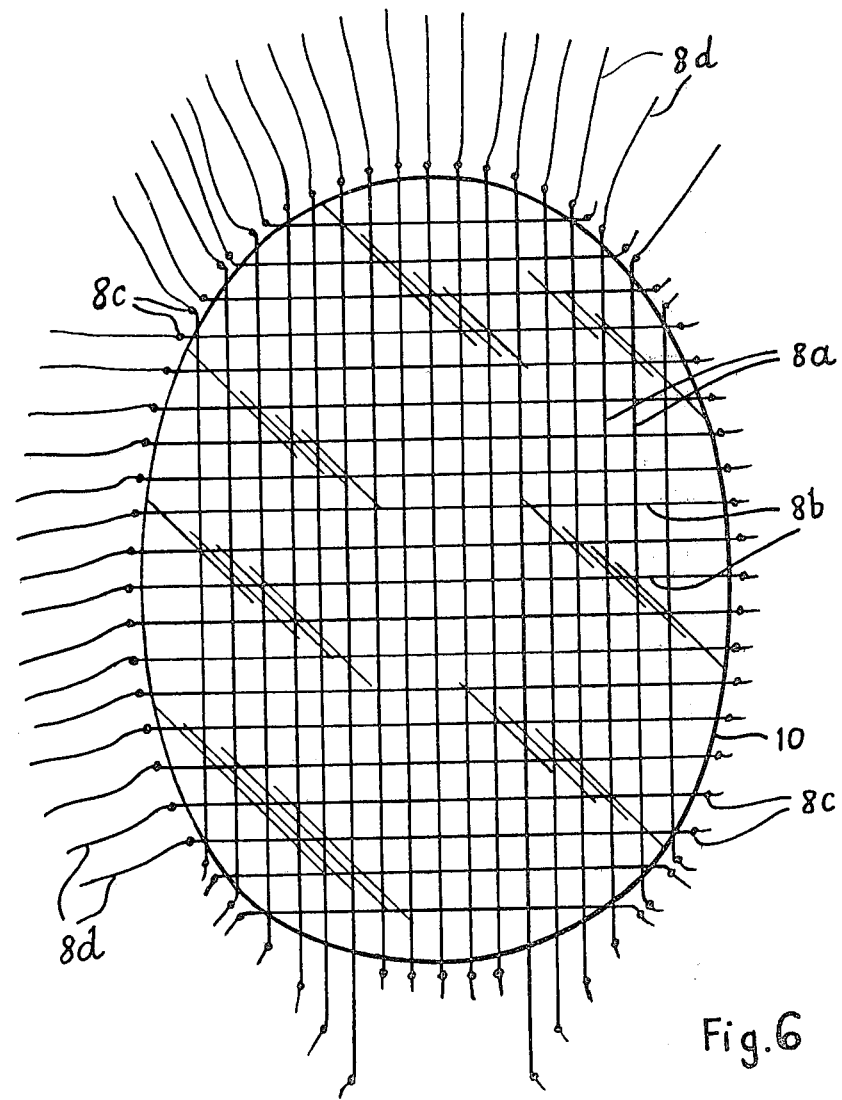
FIG. 6 is a view of a modified form of pre-woven mesh.

Instead of individually tensioning and fitting the string portions of the meshes by means of a manual lever 9 which co-operates with the knots, tensioning and fitting may be achieved by pulling the free ends or tails of at least some of the string portions by an appropriate machine or device, or by hand. For this purpose, as shown in FIG. 6, the pre-woven meshes are provided with relatively long tails 8d (for example of the order of 8 inches long) at one end of each main and cross. These tails are cut off after the respective string portions have been tensioned by their tails, and after the adjacent knots are seated and anchored in the channel.

Figure 7:
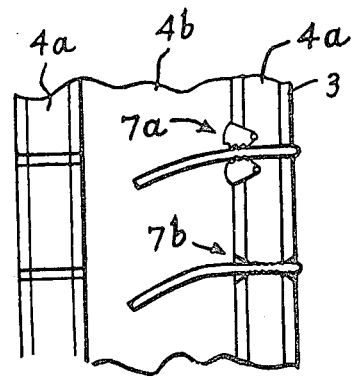
FIG. 7 is a fragmentary side or edge view of a portion of the head frame of a further embodiment of racket showing diagrammatically two alternative forms of self-cleating devices.

Whilst, in the previous embodiments, each string portion is anchored at both ends by knots, other forms of anchorages may be employed. For example, as illustrated in FIG. 7, self-cleating devices of the form indicated at 7a, or at 7b, are located within the channel adjacent the associated slots, or are set into the flanges adjacent the slots. The cleating devices may be based on miniaturised versions of releasable cleats for ropes etc., as used on yachts or sailboats. The form of cleat shown at 7a comprises a pair of jaw members having serrated or toothed cleating surfaces, one or both jaw members being pivotally or resiliently mounted so as to be biassed towards the other and grip the string portion therebetween. The form of cleat shown at 7b comprises a slot, the opposed cleating surfaces of which are serrated or toothed, and mutually converge towards the base of the slot, i.e. generally radially inwardly of the frame as viewed in FIG. 1.

In use, tension is applied to the tail of the associated string portion whilst the tail is pressed down into the cleat between the toothed cleating surfaces, or subsequent thereto. When the required tension is attained, the tail is released and cut off. Thereafter, due to the unidirectional wedging action of the cleating surfaces, the tension in the associated string portion serves to increase the grip of the cleat teeth on the string portion. Not only do these cleats eliminate the need for accurate knotting, but they also allow the tension to be adjusted, and permit pre-woven meshes of standard dimensions to be fitted to frames of differing dimensions.

The cleats, and in particular the string portions where they are anchored thereby, may be disposed generally normally to the side faces of the frame, or may define obtuse angles therewith of, for example, approximately 30° to 45°, so as to reduce the angle through which the string portions, and in particular the tails, are deflected during and subsequent to fitting.

The pre-woven meshes for self-cleating frames may be provided with un-knotted tails at one end, corresponding to the tails shown in FIG. 6, if only one end of each string portion is cleated. Alternatively, if both ends are cleated, the string portions may be provided with un-knotted tails at both ends.

From the foregoing, it will be seen that there is provided a particularly advantageous double-strung racket, and also a method of double stringing. The requirement for relatively complicated and expensive stringing machines is eliminated; the speed at which stringing may be effected by skilled and semi-skilled persons, as well as amateurs at home, is significantly increased; no weaving or knotting is required by the person fitting the stringing; the pre-selected identical or different tensions are automatically achieved for each string portion when the string portions are knotted at both ends; and no temporary clamping of the stringing is required. Thus all of the problems initially mentioned are eliminated or reduced to insignificant proportions.

In addition, it will be apparent that the breakage of individual string portions will not affect the tension of the other string portions, and that replacement of one or more mains and/or crosses may be rapidly and simply effected.

It will be understood that various modifications may be made without departing from the scope of the present invention. For example, it may be necessary to additionally strengthen the frame, particularly if it is of a laminated wood construction. Reinforcement may take the form of metal or fibre-reinforced plastic strips, for example corresponding to the strips 3, which may be located externally and/or internally of the channel 4.

Rackets having metal head frames, for example a head frame extruded from an aluminum alloy with a profile of extended generally "D" or "C" configuration as described in my aforesaid copending application, may be used, the slots being formed by machining.

The head frames may be formed, for example molded, from a plastics material, such as glass or carbon fibre reinforced plastics, in which event the channel and slots are preferable produced by the molding process. In this event, the slots as molded may be sufficiently smooth to be compatible with the stringing without subsequent finishing operations. The reinforcing fibres will be so oriented as to strengthen the flanges between the slots. The reinforcing fibres may be laid as required, pre-woven, or may be in the form of a woven seamless sleeve, as described in my copending application.

A strip or strips of material which is more compatible with the stringing than the material of the frame, for example a rigid or semi-resilient synthetic plastics material, may be fitted around the periphery of the frame, the strips being formed to fit into each slot to protect the stringing from the frame. Alternatively, individual liners or sleeves of such a relatively compatible material may be fitted into the slots. Before being knotted, the individual string portions may be fitted with tubular sleeves, grommets, washers or the like which engage in the slots, and/or engage between the knots and the internal faces of the channel, and/or engage between the string portions and the external side surfaces or the strips 3 of the frame, when the string portions are fitted.

The channel 4 and its flanges 4a may be formed integrally with the head frame, or may comprise a separate, circumferentially extending, continuous or interrupted, channel-section strip of a relatively rigid synthetic plastics material mounted on, for example secured to, the outer periphery of the head frame, basically as described in my copending application, but provided with stringing-receiving slots instead of apertures.

In order to resist the separational forces or bending moments exerted on the channel flanges by the individually anchored string portions, the opposed portions of the two flanges defined between the circumferentially distributed pairs of opposed slots may be tied together. This may be achieved by forming a circumferentially interrupted channel, instead of a circumferentially continuous channel as illustrated. This may be achieved by initially forming the frame (or separate surround strip) with circumferentially spaced, peripherally opening pockets or recesses at the locations of the slots, which are of sufficient size to at least accommodate the knotted ends of the string portions, and the tip of the stringing tool. These individual pockets or openings may be circular, oval, or of any other appropriate configuration. Instead of integrally interconnecting the opposed flange portions as just described, the latter may be tied together by inserts in the channel which span the latter.

The knots or other anchorages may be seated against the internal surfaces of the flanges or equivalent, or may be seated in enlargements or pockets at the inner ends of the slots. Thus, in the inclined slot configuration as previously described with reference to FIGS. 27 and 28 of my copending application, the slots may open directly into the outer peripheral surface of the frame (or surround strip), and may be provided with pockets at their peripherally outer ends to accommodate the knots or cleats or equivalent, so that the latter will be recessed below the outer peripheral surface.

Whilst the string portions are preferably supplied pre-knotted at or adjacent opposite ends, this may not always be appropriate. For example, whilst FIG. 1 shows an open-throated racket, i.e. a racket in which a separate throat member 2d bridges the neck 1a and defines a gap 2e therewith which accommodates the radially-opening ends of stringing-receiving slots 7 in the throat member, if a closed or wedge throat construction (not shown) is employed then some of the central main string portions may have to be threaded through passages in the throat or neck. This is because the provision of slots 7 of excessive length may well weaken the frame in the region of the neck. Such stringing-receiving passages would either have to be of a large enough diameter to allow the knotted ends of the mains to pass therethrough, or preferably the central mains would each be supplied with one end unknotted, but with an indication thereon as to where the knot should be tied after the string portion is threaded through its associated passage in the neck or throat. When knotted, the lever 9 would be applied to the opposite pre-knotted end of the main at the tip of the frame.

Whilst, in the illustrated embodiments, the individual string portions are anchored by knots and/or cleating devices, other forms of anchoring, wedging or locking device may be employed. For example, resilient or split tapered collets, similar to miniaturised versions of collets employed to anchor the strand reinforcements in prestressed reinforced concrete structures, may engage or be fitted around the tails of the string portions. Such collets would cooperate with the slots or channel in the head frame (or the previously mentioned chanel-section strip) under the effect of the tension in the string portions so as to contract onto and positively grip the string portions.

The cleats or other devices may be individually fitted to the head frame (or channel-section strip), may be formed integrally therewith, or may be attached to or carried by the string portions. To facilitate assembly, a series of such cleats or other devices may be integrally interconnected by webs to form a strip. For example, the series of cleats or other devices may be integrally molded from Nylon or equivalent to form a flexible strip, which is fitted into and around the channel, either before or after inserting the tails, the inter-device spacing corresponding to the inter-slot circumferential spacing, so that alignment of the devices and slots is assured.

The relationship of the string portions in the pre-woven mesh as shown in FIGS. 4 and 6 may be maintained by temporarily or permanently bonding the string portions together where they cross over, instead of by providing the removable film or films 10.

The channel 4 or equivalent may, after stringing of the head frame, be protected by fitting thereinto a capping strip, equivalent to that shown in FIG. 32 of my copending application. Alternatively, the capping strip may fit over the flanges so as to assist in resisting the aforementioned separational forces or bending moments exerted on the flanges by the string portions.

I claim:

1. A games racket comprising a handle intended to be held in the hand, and carrying a head having a frame defining a central opening, across which extends tensioned stringing carried by the head, the stringing being composed of two sets of stringing with each set being disposed in a respective one of two spaced generally parallel planes, and comprising first and second groups of generally parallel string portions, with the string portions of the first group being interwoven with, and generally perpendicular to, the string portions of the second group, the frame having opposite side surfaces which are spaced apart in a direction generally normal to the planes of the stringing, with the strining passing through apertures distributed around the frame and opening into said opposite side surfaces, the frame being provided in its outer periphery with a channel extending around the central opening and defining flanges with said opposite side surfaces, with the stringing-receiving apertures opening into the channel, wherein at least some of the stringing-receiving apertures comprises slots in said flanges which open into the outer periphery of the frame, and wherein at least some of the string portions comprise discrete lengths of stringing which, at or adjacent their opposite ends, are located in associated slots and are anchored within the channel.

2. A racket as claimed in claim 1, wherein substantially all of the stringing-receiving apertures comprise said slots, and wherein substantially all of the string portions comprise said discrete lengths of stringing.

3. A racket as claimed in claim 2, wherein the discrete lengths of stringing are pre-woven with each other, and are pre-knotted at or adjacent at least one of their ends, said knots cooperating with the frame within the channel to anchor the lengths of stringing under tension to the frame.

4. A racket as claimed in claim 3, wherein the discrete lengths of stripping are pre-knotted at or adjacent their opposite ends, the inter-knot spacing of each length of stringing being precisely predetermined in relation to the spacing between the specific pair of slots which that length of stringing spans to maintain that length of stringing at substantially the required predetermined tension.

5. A racket as claimed in claim 2, wherein at least some of the discrete lengths of stringing have predetermined different tensions.

6. A racket as claimed in claim 3, wherein the discrete lengths of stringing are pre-knotted at or adjacent one of their ends, the other of their ends being anchored in respective anchor means carried by the frame and located within the channel adjacent the associated slots.

7. A racket as claimed in claim 6, wherein each anchor means is adapted to apply a uni-directional locking force on its associated discrete length of stringing thereby to permit the length of stringing to be displaced relative to the anchor means to increase the tension in the length of stringing by application of a tensional force to the adjacent end of the latter, but to lock the length of stringing against displacement in an opposite direction when the applied tension force is removed.

8. A racket as claimed in claim 1, wherein the channel is continuous in the circumferential direction of the frame.

9. A racket as claimed in claim 1, wherein the side walls of the channel are interconnected by circumferentially distributed ties.

10. A racket as claimed in claim 9, wherein the channel is circumferentially interrupted between at least some adjacent slots by transverse ties formed integrally with the base and side walls of the channel, the spacing in a circumferential direction between adjacent ties being greater than the width in a circumferential direction of the individual slots, said spacing being at least sufficient to accommodate anchor means for the discrete lengths of stringing.

11. A racket as claimed in claim 4, wherein the radially inner ends of at least some of the slots are disposed directly adjacent the base of the channel, and wherein the lengths of said at least some grooves in a generally radial direction are such that the knots of their associated discrete stringing lengths are disposed wholly within the channel below the outer periphery of the frame, whilst the required tension is maintained in the associated discrete stringing length after assembly to the frame.

12. A method of stringing a games racket as claimed in claim 1, which comprises fitting to the head frame a plurality of discrete string portions, each of at least some of said string portions being provided at or adjacent its opposite ends with anchorage means spaced apart by a distance which is so related to the spacing between the pair of opposed slots which the associated string portion is to span, that the string portion, when so fitted, will possess the required degree of tension, the method including inserting each string portion into one of a pair of associated slots through the peripherally open end thereof, with the anchorage means within the channel, applying a tensioning force to the string portion at or adjacent the opposite end thereof to elastically stretch the string portion by an amount to permit the opposite end of the string portion to be inserted into the peripherally open end of the other slot of the pair with the associated anchorage means entering the channel, and, after entry of the latter anchorage means, removing the tensioning force to allow tension to be retained in the string portion by the cooperation of the spaced anchorage means with the frame.

13. A racket as claimed in claim 1, wherein at least one of the sets of stringing is in the form of a pre-woven stringing mesh which comprises first and second groups of generally parallel, discrete string portions, with the discrete string portions of the first group being interwoven with, and generally perpendicular to, the discrete string portions of the second group, each discrete string portion having opposite free ends, at least some of the discrete string portions, at or adjacent at least one of their free ends, being provided with anchorage means for anchoring said discrete string portions with respect to the racket head frame.

14. A racket as claimed in claim 13, including means to maintain the required positional relationship between the discrete string portions of the pre-woven mesh.

15. A racket as claimed in claim 14, wherein said maintaining means comprises at least one sheet member temporarily adhesively secured to the string portions on at least one side of the mesh.

16. A racket as claimed in claim 15, wherein said at least one sheet is a thin, transparent sheet of a synthetic plastics material, contoured to approximately correspond to the contour of the central opening defined by the racket head frame.

17. A racket as claimed in claim 13, wherein said anchorage means comprise knots in the string portions, the knots being provided at or adjacent both opposite free ends of the string portions, the inter-knot spacing of each knotted string portion being precisely predetermined to produce the required predetermined tension in that string portion when the mesh is fitted to the racket head frame.

18. A games racket comprising a handle intended to be held in the hand, and carrying a head having a frame defining a central opening, across which extends tensioned stringing carried by the head, the stringing being composed of two sets of stringing with each set being disposed in a respective one of two spaced generally parallel planes, and being composed of first and second groups of mutually parallel string portions, the string portions of the first group being interwoven with, and generally perpendicular to, the string portions of the second group, the stringing passing through slots distributed around and opening into the periphery of the frame, and opening into opposite side surfaces of the frame which are spaced apart in a direction generally normal to the planes of the stringing, the cross-sectional profile of the frame resembling an "extended D" having a body portion and extensions projecting generally transversely from the body portion adjacent opposite ends of the upright limb of the "D", said body portion constituting the main structural part of the frame and being effectively devoid of structurally weakening stringing-receiving slots, and said extensions constituting a pair of flanges extending around the outer periphery of the frame which define opposite side walls of a channel provided in the outer periphery of the frame and extending around the central opening, the stringing-receiving slots each comprising a pair of aligned slot portions formed one in each flange and extending from the outer peripheral edges thereof to positions directly adjacent the base of the channel, the number and disposition of the stringing-receiving slots being such that the stringing passes only once through each of at least the majority of the slot portions, at least the majority of the string portions comprising discrete lengths of stringing prewoven with each other to produce said two sets of stringing, said discrete stringing lengths, adjacent their opposite ends, being located in associated slot portions and being pre-knotted with said knots anchoring said discrete stringing lengths, under tension, with respect to the flanges adjacent locations where the associated slot portions open into the channel, the inter-knot spacing of each discrete stringing length being precisely predetermined in relation to the spacing between the associated pair of slot portions which that discrete stringing length spans, to maintain the latter at substantially the required predetermined tension.

19. A racket as claimed in claim 18, wherein the first and second slot portions of each of at least the majority of the stringing-receiving slots are substantially perpendicular to the planes of the two sets of stringing, and have a minimum width in the circumferential direction of the frame which is less than approximately twice the stringing diameter and is less than one half the height of the side walls, and wherein the string portions of the first and second groups of one set of stringing extend parallel to, and are directly superimposed with respect to, the string portions of the first and second groups respectively of the other set of stringing.

20. A racket as claimed in claim 19, wherein the said body portion which constitutes the main structural part of the frame is generally rectangular, two opposed sides of the rectangle being extended beyond the body portion to form said pair of flanges, which are structurally rigid with the body portion, wherein the height of the side walls of the channel is at least twice said minimum width of the slot portions, and wherein the ratio of the width of the frame between the outer surfaces of the sdie walls, to the radial thickness of the frame is of the order of 20 to 22:16, the width of the frame being of the order of 20 to 25 mm.

21. An elongate strip, attached, or attachable, to the outer peripheral surface of the head frame of a games racket of the type comprising a handle intended to be held in the hand, and carrying the head frame which defines a central opening, across which extends tensioned stringing carried by the frame, the frame constituting a load bearing member which accommodates the forces exerted by the stringing, the stringing being composed of two sets of stringing, with each set being disposed in a respective one of two spaced generally parallel planes, and with each set being composed of a prewoven mesh of discrete lengths of stringing which are pre-knotted at predetermined positions adjacent their opposite ends, wherein the elongate strip is formed from a relatively hard synthetic plastics material and has an inner peripheral surface profiled to cooperate with the outer peripheral surface of the frame, the strip further including an outer peripheral surface, a channel extending longitudinally of the strip and opening into the outer peripheral surface, and a pair of opposite side surfaces or flanges extending between the inner and outer peripheral surfaces of the strip, the strip being provided with stringing-receiving slots distributed therealong, extending between and opening into the opposite side surfaces of the strip, each slot comprising a pair of aligned slot portions, one in each flange, opening at its radially outer end through the outer peripheral edge of its associated flange and terminating at its radially inner end directly adjacent the base of the channel, the slots being dimensioned and arranged so that, when the strip is operatively assembled to the frame, they receive and locate the discrete string lengths in said two sets, with the knots at the opposite ends of the discrete stringing lengths engaging the strip internally of the channel to anchor the discrete stringing lengths under the required tension.

22. A strip as claimed in claim 21, wherein the channel is interrupted, between adjacent slots, by tie elements transversely spanning the channel and interconnecting the flanges.

23. A strip as claimed in claim 22, wherein said tie elements are integrally connected to the flanges and the base of the channel.

* * * * *